United States Patent [19]

Wallis

[11] 4,396,918
[45] Aug. 2, 1983

[54] LOW-FREQUENCY RADIO NAVIGATION SYSTEM

[75] Inventor: David E. Wallis, Glendale, Calif.

[73] Assignee: The United States of America as represented by the Administrator of the National Aeronautics & Space Administration, Washington, D.C.

[21] Appl. No.: 241,154

[22] Filed: Mar. 6, 1981

[51] Int. Cl.³ ............................................... G01S 1/30
[52] U.S. Cl. .................... 343/105 R; 364/452
[58] Field of Search .......................... 343/105; 364/452

[56] References Cited

U.S. PATENT DOCUMENTS

| | | | |
|---|---|---|---|
| 3,303,501 | 2/1967 | Mahoney | 343/105 H |
| 3,974,502 | 8/1976 | Phipps | 343/105 R |
| 4,015,262 | 3/1977 | Etcheverry et al. | 343/105 R |
| 4,028,703 | 6/1977 | Honore et al. | 343/105 R |

*Primary Examiner*—Theodore M. Blum

*Attorney, Agent, or Firm*—Paul F. McCaul; John R. Manning

[57] ABSTRACT

A method of CW navigation is provided using four transmitters (TR1-TR4) operating at sufficiently low frequencies to assure essentially pure groundwave operation. The transmitters are keyed to transmit constant bursts ($\frac{1}{4}$ sec) in a time-multiplexed pattern with phase modulation of at least one for identification of the transmitters with the ability to identify the absolute phase of the modulated transmitter(s) and the ability to modulate low-rate data for transmission. The transmitters are optimally positioned to provide groundwave coverage over a service region of about 50×50 km for the frequencies selected in the range of 200-500 kHz, but their locations are not critical because of the beneficial effect of overdetermination of position of a receiver (R) made possible by the fourth transmitter. Four frequencies are used, at least two of which are selected to provide optimal lane resolution. All transmitters are synchronized to an average phase as received by a monitor receiver (M).

8 Claims, 5 Drawing Figures

LOW-FREQUENCY RADIO NAVIGATION SYSTEM

ORIGIN OF INVENTION

The invention described herein was made in the performance of work under the NASA contract and is subject to the provisions of Section 305 of the National Aeronautics and Space Act of 1958, Public Law 85-568 (72 Stat. 435; 42 USC 2457).

FIELD OF THE INVENTION

This invention relates to radio navigation systems having broadcast communication capability, and more particularly to a CW radio navigation system using four displaced transmitters and one or more frequencies, with an accuracy of 5 meters over a service region of 50×50 km.

BACKGROUND OF THE INVENTION

Low-frequency radio navigation systems have evolved from the early Loran (LOng RAnge Navigation) system operating with pulsed frequencies between 1800 and 2000 kHz and the Loran-C/D systems operating at a frequency of 100 kHz. Each Loran station operates in a pulsed sequential mode such that only one out of three stations can be received at a time. During the transmission pulse period of the master station, both slave stations remain silent, after which the slave stations will transmit pulsed energy in sequence. The time differences between pulses received from the slaves, as compared to the master, provide hyperbolic navigation in an acceptable manner for most purposes, particularly over a long range of about 1000 km. For navigation over longer ranges, the Omega system operating in the 10.2 to 13.6 kHz band may be used, but accuracy is limited to 1 or 2 nautical miles at the present state of the art in predicting the phases of the Omega skywaves as functions of position and time. Omega transmits keyed (interrupted) CW signals from eight stations on several discrete frequencies utilizing multiplexing techniques.

For navigation over very short ranges, such as to 100 km from the transmitter, the pulsed format of Loran C/D is not necessary to discriminate the highly predictable groundwave from the unpredictable skywave. Therefore, continuous wave (CW) signals, keyed in an Omega-like format, can be used.

Instantaneous position and velocity may be determined by phase comparison of CW transmissions from three or more synchronized transmitters. Two CW systems offering such capability are presently in operation. One is the keyed CW Omega system referred to above, and the other is an unkeyed CW system known as Decca, which operates in the 70 and 130 kHz frequency band. A Decca receiver measures and integrates the relative phase difference between the signals from the transmitters which operate at different frequencies for identification. Tracor, Inc. of Austin, Tex., has studied the use of a keyed CW system for river and harbor navigation, and Collins Telecommunications Systems Division of Rockwell International has amplified on that study.

The present invention implements a keyed CW system to provide radio navigation for the Army's proposed Mobile Automated Field Instrumentation System (MAFIS) using the highly predictable groundwave from a plurality of transmitters which transmits a single frequency or multiple frequencies in a time multiplexed pattern. The choice of frequency is not critical, but frequencies in the range 200–500 kHz offer the widest groundwave coverage by minimizing skywave effects as a function of range. MAFIS is to be used for command and control, communications, weapons-engagement, and navigation (position and velocity) of up to 2000 receivers, where each receiver may be assigned to a soldier, tank or other mobile unit. This application requires 15-meter accuracy over areas as large as 50×50 km. Such a requirement cannot be met by any existing operational system.

SUMMARY OF THE INVENTION

In accordance with the present invention, four CW transmitters operating at a sufficiently low frequency to assure essentially pure groundwave operation are continually keyed in a time-multiplexed pattern with bi-phase modulation (180° phase inversion), in such a pattern as to permit identification of the transmitters with the ability to identify the absolute (unmodulated) phase of their signals, and to suppress interference to the navigation from external sources. Four transmitters are used instead of the usual minimum of three to provide a more robust system in the sense of greater immunity from noise and geometrical dilution of precision. The time slot for each transmitter carrier burst is the same length. That simplifies phase measurements and phase tracking. Notwithstanding the phase modulation for transmitter identification, low-rate data can be transmitted in the form of short codes phase modulated on the carrier bursts synchronized with the bursts such that a receiver upon detection of data bits may infer the absolute signal phase so that positional tracking is unimpaired.

The transmitters are optimally positioned to provide groundwave coverage over a service region of about 50×50 km, so as to provide the maximum coverage with minimum skywave corruption of the groundwave for the frequency band selected. However, the locations of the transmitters are not critical because of the beneficial effect of overdetermination of position made possible by the fourth transmitter.

Although the four-transmitter system may operate with a time-multiplexed single frequency, it is preferable to use four different frequencies time multiplexed from each transmitter for improving the overall signal-to-noise ratio of the system, and resolving ambiguity of position within the area of coverage. A phase control receiver monitors all four transmitters and continually corrects all to a common, equal value of phase, as received by the monitor receiver. The frequencies of the transmitters are so selected that they stand in ratios such as to provide optimal multiple-frequency lane resolution.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
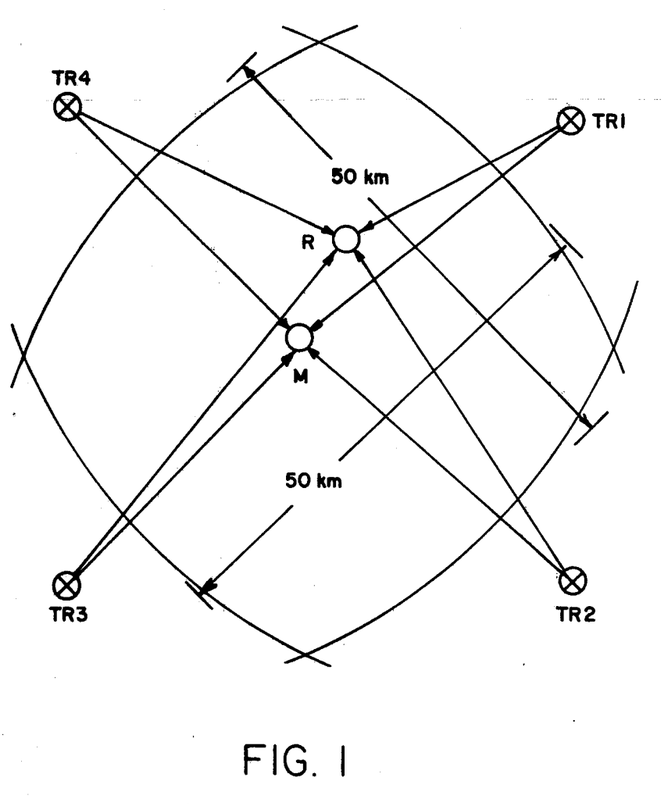
FIG. 1 is a pictorial diagram of the transmitter network arrangement.

Referring to FIG. 1 of the drawings, the preferred implementation of a radio navigation system utilizes four keyed CW transmitters TR1 through TR4, each operating in the very low frequency band of approximately 200 kHz to 500 kHz, for example near 300 kHz; a network phase-control monitoring receiver M with communications links to the transmitters to maintain phase synchronization among all transmitters; and any number of mobile navigation receivers R. In addition there may be a command control central station (not shown) and communications links to the monitor and transmitters for status monitoring, and for broadcast of low-rate data to the receivers via one or more of the transmitters. These various communications links (not shown) may be by cable or UHF radio. There may also be a radio communications link from each receiver to the command control central in order for each receiver to transmit its identification code and position data, either periodically or on demand from the command control central.

As proposed for MAFIS, the navigation system is provided for monitoring the positions and velocities of the receivers. Therefore, the position and velocity data are not displayed at the receivers, but for other applications, such as river and harbor navigation, such display could be provided on a chart overlay, or any other display, such as a printout of X and Y coordinates of the Universal Transverse Mercator (UTM) grid used by the Army and surveyors in general.

The transmitters are optimally situated at locations approximately at the corners of a square having a 72 km diagonal for operation with essentially pure groundwave coverage of a service region of 50×50 km. Actual transmitter locations may be based on minimizing perturbing effects of vehicle traffic, terrain ruggedness, dielectric discontinuities such as deep fresh water, rock, etc., and reradiators, such as towers, power lines, and railroad tracks. While optimizing overall coverage, an attempt is made to obtain 15-meter accuracy in a prime-coverage subregion of the 50×50 km service region. The choice of 300 kHz as the frequency, and 72 km as the diagonal of the service region is based upon maximizing the extent of the service region for a specified amount of propagation error, principally the skywave error.

Propagation errors of the CW signals from the four transmitters pose the greatest difficulty in achieving this 15-meter accuracy. The 285 kHz to 500 kHz range is selected to minimize skywave contamination in the service region of 50×50 km, and provide the greatest stability of propagation. The spacing of the transmitters is chosen on the basis of some analysis of the maximum range at which worst-case skywave corruption of the groundwave would be negligible (40 dB below groundwave). The maximum range obtainable under these considerations is approximately 72 km using frequencies in the 300 to 400 kHz subrange.

Figure 2:
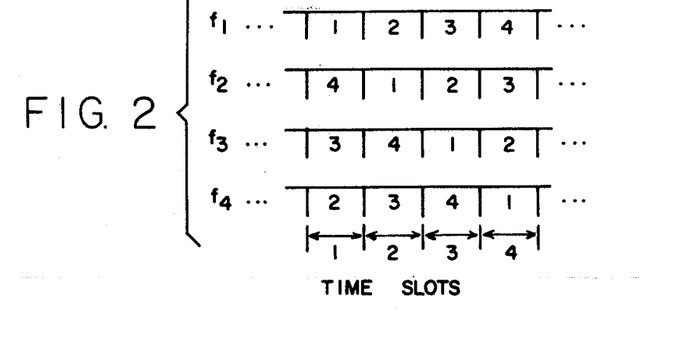
FIG. 2 is a diagram of the time-division multiplex pattern of four frequencies transmitted by four transmitters in equal time slots.

The basic signal pattern is shown schematically in FIG. 2 for the time-multiplexed transmitters. The basic pattern has four time slots 1, 2, 3 and 4 and four frequencies $f_1$, $f_2$, $f_3$ and $f_4$. In each time slot, a transmitter keys one of its frequencies on the air at constant amplitude, and with constant phase. The transmitters transmit on these frequencies in cyclic time sequence. Transmitter TR1 transmits on frequency $f_1$ in time slot 1, then on frequency $f_2$ in time slot 2, etc. Transmitters TR2, 3 and 4 use the same pattern displaced by 1, 2 and 3 time slots, respectively. In each time slot, a transmitter keys one of its frequencies on the air at constant amplitude and with constant phase. The pattern repeats continuously. Note that every transmitter is transmitting a different frequency during each time slot so that all transmitters are on at all times for maximum power transmission into the service region for maximum total signal-to-noise ratio.

Unlike the Omega system, all time slots are of equal length (0.25 sec), and so the frequency burst length is not to be used to identify the transmitters. Using equal length time slots greatly simplifies phase measurement and phase tracking. For transmitter identification, a different and unique technique is then provided in the following manner. One transmitter, such as transmitter TR1, is inverted in phase for one time slot every third basic pattern in the case of a single frequency embodiment in which a single frequency is time-multiplexed among all of the transmitters as shown for the first row of the pattern in FIG. 2.

In the case of a multiple frequency system, more design freedom is available for structuring a transmitter identification system. For example, it would be possible to have all transmitters invert their phase in a predetermined time slot of every third basic pattern. Yet another convention might be to invert all phases of all frequencies during every third basic pattern. And to achieve a combined synchronization and interference suppression capability, the sequence of inversion over six patterns might be $+ + - - + -$, where a minus designates phase inversion of all frequencies in a basic pattern. This biphase modulation sequence allows identification of the transmitters, identification of the absolute phase, and interference suppression. Shorter sequences of biphase modulation would serve to identify the transmitters, but that would not allow the receivers to infer the absolute phase (polarity) of the received signals. The result would be to effectively cut the tracking wavelength in half, thereby doubling the number of phase-modulus ambiguities. The interference suppression feature provides the most powerful capability in the real world interference environment, and is therefore the preferred choice.

A single-frequency embodiment using a frequency of about 300 kHz has a 1 km wavelength and 0.5 km lane width, which implies ambiguous position fixes spaced at approximately 0.5 km. Within the service region of 50×50 km, the only available means for resolving these ambiguities are (1) a "consistency" method in which a search of the hyperbolic grid compares combinations of phases from four transmitters for geometrical consistency, and (2) using the leading edge slope of each narrowband carrier burst, as in Loran C/D. Lack of bandwidth on the transmitters may preclude the leading edge technique, and the "consistency" method may not be sufficiently reliable.

Without some means for resolving lane ambiguity in a single frequency system, it would be necessary for the operator of a receiver to initialize the system to a known, or assumed, position within a half lane width. Ambiguity would then be resolved by selecting as the "correct" position the one that is closest to the assumed position out of all possible positions having the measured phase angles of signals from all transmitters. In the event there are two equally close possibilities, the ambiguity is resolved by some predetermined convention, such as selecting the one to the north. Once that is done initially, the navigation problem is then just one of tracking.

In the four-frequency embodiment of the invention, however, lane ambiguity is resolved by the use of a commensurate relationship among the four frequencies such that $$m\lambda_1 = n\lambda_2 = p\lambda_3 = q\lambda_4$$

where m, n, p and q are minimum integers (i.e., have no common divisors) and $\lambda_1$, $\lambda_2$, $\lambda_3$ and $\lambda_4$ are the wavelengths of the frequencies, provided that the period of the commensurateness ($m\lambda_1$, $n\lambda_2$, $p\lambda_3$ or $q\lambda_4$) is greater than twice the width of the service region, 50 km in this example. However, for maximum robustness (immunity from noise and geometrical dilution of precison), the wavelengths (frequencies) should be so chosen that the commensurate "wavelength" of at least one pair of frequencies, e.g. $m\lambda_1$ with $n\lambda_2$, is the shortest one possible to exceed twice the width of the service region.

The measured phases of the separate commensurate frequency signals jointly contain information on the correct phase within the long commensurate "wavelength." A mathematical likelihood function can be constructed and searched to find the correct phase. In a two-frequency embodiment, for example, ambiguous position in one of a large number of possible lanes can be resolved by effectively searching a predetermined table of phases of two commensurate frequencies for the closest match with a pair of phase measurements of the two commensurate frequency signals throughout the entire commensurate "wavelength" of the two-frequency combination. The phase measurements of the two measured commensurate frequency signals will have a closest match to the tabulated phases at the correct lane. Lane resolution is thus achieved by using phase measurements from commensurate frequency signals and effectively looking up a table of predetermined phases for the argument of a pair which has the closest match to a measured pair. This tabular argument provides lane resolution. How this is used for a position fix will be explained hereinafter with an example. If the two frequency signals selected are from the same transmitter, "radial" lane resolution is effected, and if from a pair of transmitters, "hyperbolic" lane resolution is effected.

To construct a likelihood function for searching the table for the closest match, the differences between the measured phases and the tabular phases are computed. Then the sums of the squares of these differences are computed and a search is conducted for the minimum sum of the squares. In computing the differences between the tabular phases and the measured phases, should any difference exceed 180°, its complement (360° minus the difference) is used in its stead.

Figure 3:
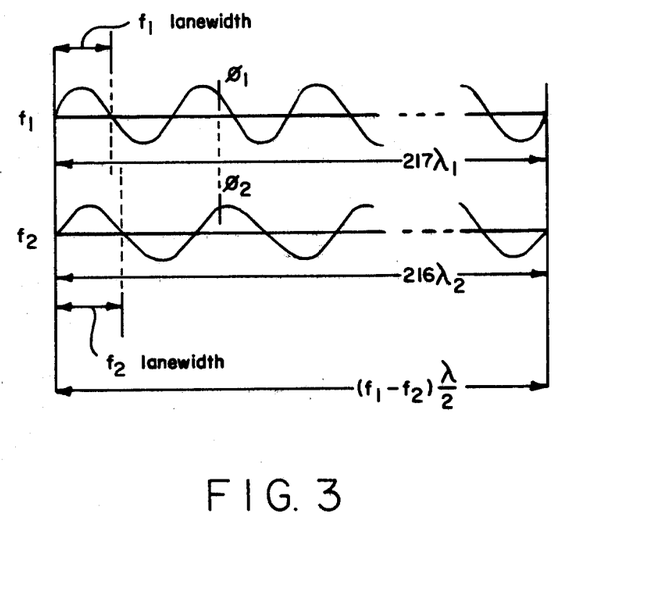
FIG. 3 is a diagram that illustrates lane ambiguity resolution using commensurate frequency signals.

A two-frequency example will clarify how commensurate frequencies aided by the likelihood function are used to resolve lane ambiguity. Assuming operation at near 300 kHz, frequency $f_1$ may be selected to be exactly 300 kHz, and frequency $f_2$ may then be selected to be 216/217 300 kHz. Both will then have lane widths of about one kilometer, i.e., the phase cycle for each repeats itself about every kilometer so that phase measurements for determining position in the service area are ambiguous. This ambiguity can be resolved, however, by noting that the instantaneous phase of each relative to the other is unique over the commensurate wavelength consisting of 217 wavelengths at 300 kHz, i.e., throughout the entire span over which $217\lambda_1$ coincides with $216\lambda_2$, where $\lambda_1$ and $\lambda_2$ are the wavelengths at frequencies $f_1$ and $f_2$. For every possible position in that span there will be a different combination of phase measurements for the two commensurate frequencies. Consequently, having measured the phase $\phi_1$ of the signal at frequency $f_1$ and the phase $\phi_2$ of the signal at frequency $f_2$, there is only one lane for the signal of frequency $f_1$ or $f_2$ where the particular combination of $\phi_1$ and $\phi_2$ holds, as shown in an exaggerated form in FIG. 3 from which it can be seen that for each point along the commensurate wavelength at $217\lambda_1$, there will be a unique pair of phase measurements of the two frequencies $f_1$ and $f_2$. Predetermining and tabulating these phases with the accuracy of phase measurement that is possible in this navigation system (5 meters) will then permit resolution of lane ambiguity for the signal of frequency $f_1$ or $f_2$. With this lane-resolution capability built into the receiver, no external input is required to obtain data from which a unique position fix in the 50×50 km region can be obtained, and from which the phase tracking process can be initialized.

To obtain a unique position fix, it may be noted that the lane resolution process determines the tabular argument at which the tabulated phases most closely coincide with the measured phases. This tabular argument, so determined from the measured phases, is itself a "phase measurement" within the (long) commensurate "wavelength." If, for example, "radial" lane resolution (described below) is done for two or more frequencies from each transmitter, the effect is mathematically indistinguishable from having used a lower frequency for each transmitter. Thus, these "phase measurements" for three or more transmitters can be used to determine position. Because of the lower frequency mathematically induced by lane resolution, the ambiguous position fixes (spaced approximately every half wave, for whatever frequency is used) are more widely spaced. With a commensurate "wavelength" twice the span of the 50×50 km region, unambiguous position fixing within this region is thereby obtained.

Figure 4:
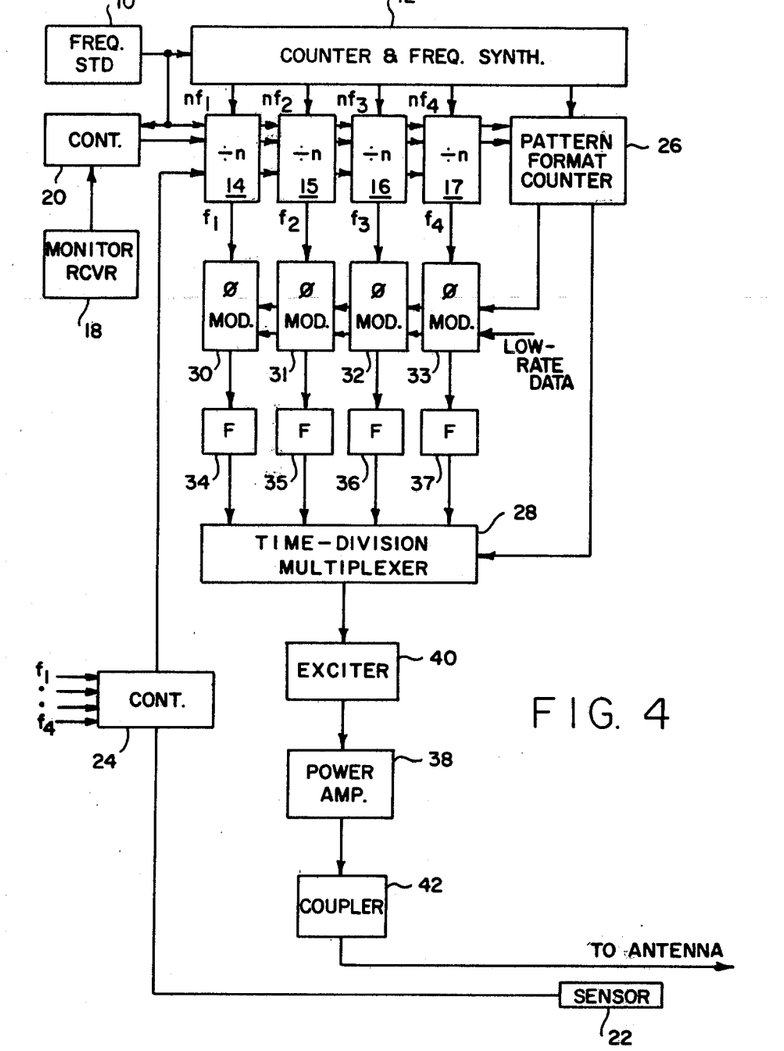
FIG. 4 is a block diagram of an exemplary transmitter.

The organization of the transmitters and receivers will now be described. FIG. 4 illustrates a functional block diagram of each transmitter which radiates the four keyed, time-multiplexed and phase-synchronized CW signals at commensurate frequencies $f_1$ through $f_4$. A separate rubidium- or cesium-beam frequency standard 10 is connected to each transmitter for open-loop synchronization of all transmitters. The monitor M (FIG. 1) continually corrects the phase of each transmitter to a common equal value of phase as received at the monitor M. It also synchronizes the keying of the transmitters in accordance with the pattern shown in FIG. 2. Use of a very stable frequency standard at each transmitter will minimize drift at the transmitters, and therefore minimize the rate at which the monitor M will need to transmit phase-control commands for maintaining phase synchronization among all transmitters.

A binary counter and frequency synthesizer 12 is driven by the frequency standard 10 to generate a multiple n of the frequencies $f_1$, $f_2$, $f_3$ and $f_4$. A suitable counter and frequency synthesizer is made commercially by Hewlett-Packard Co. (Model 6333). These frequencies are divided by n in binary counters 14 through 17 to produce the desired frequencies $f_1$ through $f_4$. The multiple n is selected to be large, such as $2^{12}$, in order that phase adjustments can be made in increments of $2^{12}$ per frequency cycle by inhibiting or injecting counts in these counters synchronized with cycles of the frequency standard. These phase adjustments are made under command control from the monitor via a monitor receiver 18 and control unit 20.

The monitor receiver 18 (coupled to the monitor M shown in FIG. 1 via cable or UHF radio) receives commands that are preceded by a transmitter identification code. Once the identification code is decoded, the monitor receiver 18 triggers the control unit 20 to advance or retard each of the frequency dividers 14 through 17 separately a number of counts specified by the command received from the monitor M.

A local control loop slaves the antenna current to the desired reference phase in the frequency synthesizer using a transmitter current sensor 22 and control unit 24, in a manner similar to that used in Loran C/D, which is to compare the antenna current phase at each of the frequencies to the phase of the frequency synthesizer. To facilitate implementation, a separate control unit may be used for each frequency, or a single, more complex unit may be time shared. In either case, closed loop control stabilizes the transmitter against local phase drift due to local conditions in the circuitry of the transmitter.

The counter and frequency synthesizer 12 also drives a pattern format counter 26 which provides an output at the keying frequency to drive a time division multiplexer 28, and a separate signal that is up (high) for every third period of the signal applied to the multiplexer, for example, or for the + + − − + − pattern referred to hereinbefore. The latter output is applied to a bank of biphase modulators 30, 31, 32 and 33 which selectively invert the phase of the signals at respective frequencies $f_1$, $f_2$, $f_3$ and $f_4$ for identification of transmitter. This pattern format counter must also be synchronized with the pattern counter of all other transmitters. Once the transmitters are initially synchronized in this respect, the monitor M will maintain synchronization, just as it does phase synchronization of the frequencies transmitted.

Also connected to at least one of the modulators, such as the modulator 33 for the frequency $f_4$, is low-rate binary data to be biphase modulated on the carrier, although in practice, the low-rate data may be applied to all modulators simultaneously, as shown. In either case, the one transmitter biphase modulated for identification should not be used for this low-rate data communication in order to permit receivers to continue tracking the pattern and determine "sync" with the pattern as well as the absolute phase at all times.

The biphase modulators are coupled to the multiplexer 28 by waveshape filters 34, 35, 36 and 37 which smooth the digitally synthesized signals into sinusoidal signals at the fundamental frequencies $f_1$, $f_2$, $f_3$ and $f_4$. This is in order to limit signal bandwidth. The output of the multiplexer drives a high-power, phase-stable amplifier 38 through an exciter 40. A multituned coupler 42 couples the output of the amplifier to the antenna. The amplifier provides approximately 2 kW of power into a 10% efficient vertically polarized antenna for radiation of about 200 watts.

Figure 5:
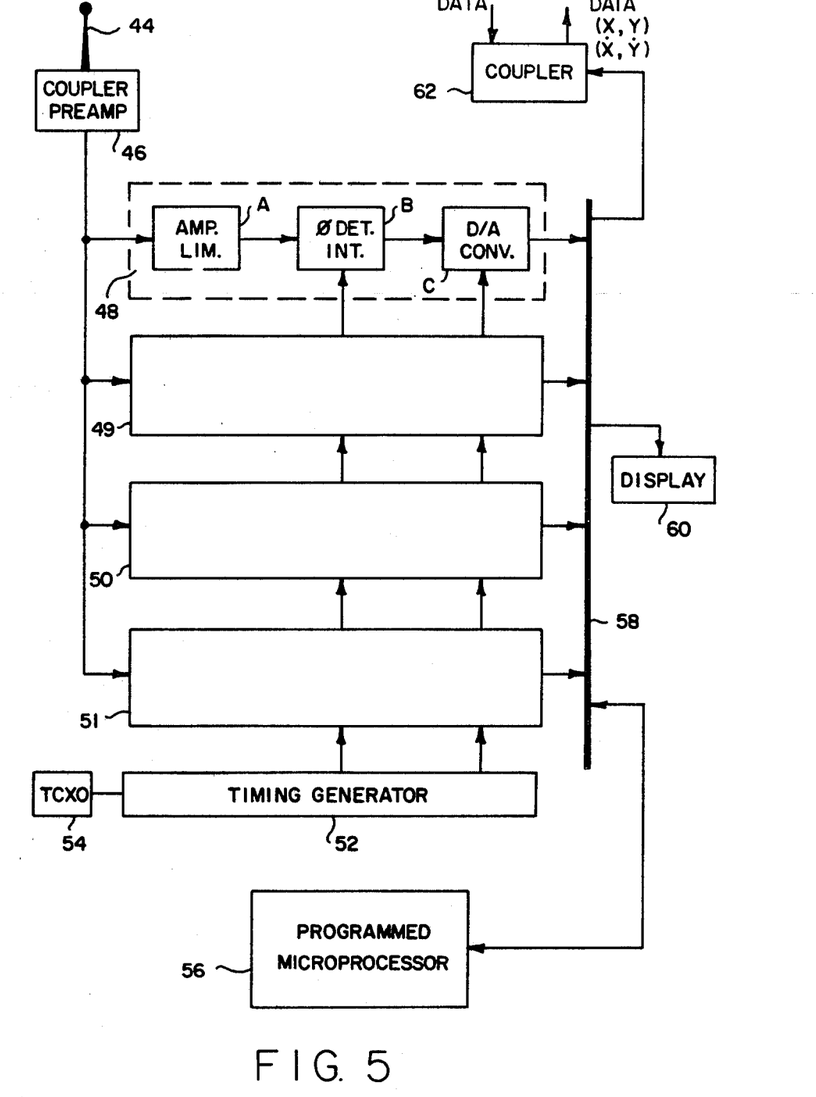
FIG. 5 is a block diagram of an exemplary receiver.

FIG. 5 is a functional block diagram of a four frequency navigation receiver of the open-loop type in which phase tracking and other navigational functions are accomplished by a programmed microprocessor.

Any signal from a low-frequency antenna 44 is picked off by an antenna coupler-preamplifier 46 (containing provision not shown for injection of a phase-shift calibration signal used to permit built in test as well as calibrate the phase shift as would be required for radial lane resolution). The preamplifier drives four parallel tuned receiver strips 48, 49, 50 and 51, each of which includes three sections A, B and C in cascade.

The first section A is comprised of a filter-amplifier and limiter. The next section B includes a phase detector and integrator. The last section C includes an analog-to-digital converter to provide digital phase measurements for processing. Phase detection and analog-to-digital conversion are synchronized by a timing generator 52 having a temperature-compensated crystal oscillator 54 as its timing reference. The digital outputs are connected to a programmed microprocessor 56 via an input/output bus 58. Coupled to the bus are a display 60 (if desired) and a coupler 62. The display is useful for calibration and diagnostics, but may also be used for display of position on a navigation overlay. The coupler is used to couple (to a cable or UHF radio) navigation data (coordinates of position X, Y; velocity $\dot{X}$, $\dot{Y}$; and other data, such as timing data) and to couple to a local printer, or the like, low-rate communication data received via the antenna 44 and decoded by the microprocessor 56.

The coupler 62 is also used to couple in data, such as calibration data, e.g., propagation correction tables and coordinates of the transmitters and monitor at the time of setting up the navigation system. For that purpose, the coupler may include a keyboard, or other means to enter data. The microprocessor uses data from the strips 48-51, and from the coupler 62, to generate position (X, Y) and velocity ($\dot{X}$, $\dot{Y}$) date according to any of the general and well known algorithms based on the method of least squares.

In the following discussion for this algorithm, it will first be assumed that all of the transmitters are synchronized for equal phase at the transmitters for simplicity, following which the modifications to the algorithm for the method of synchronization of the transmitters at the monitor will be given. The following phase equations are shown in range units for simplicity:

$$\phi_i = r_i(X, Y) + t, \text{ modulo} \lambda \tag{1}$$

where $r_i$ is the range as a function of X and Y coordinates from the ith transmitter plus some receiver offset time t measured when the receiver is referred to any of the transmitter locations, and where $\lambda$ is the wavelength at the frequency in question. A set of four equations given by equation (1) will be solved by a method of least squares. To implement the method of least squares, let a criterion, C, be defined by the following equation.

$$C = \sum_{i=1}^{4} W_i \{[r_i(X, Y) + t] - \phi_i\}^2 \tag{2}$$

The method of least squares seeks a value for variables X, Y and t such that the value of C is minimized. W is a weighting factor which, for the present invention is more nearly constant because the different keyed frequencies are for equal time slots.

The method of least squares for the arrangement of synchronizing all transmitters to a common phase at the monitor, which is the preferred arrangement for the present invention, will now be described. The measured phase $\phi_i$ at any constant, and at any location (X, Y), is related to the receiver's position and instantaneous time offset ($t_i$) with respect to the ith transmitter by the following equation:

$$\phi_i = r_i(X, Y) + t_i, \text{ modulo}\lambda \qquad (3)$$

Note that this equation differs from equation (2) only in that time offset, $t_i$, is different for the different transmitters because the monitor, located at known coordinates $X_M$, $Y_M$ so controls the transmitters that the phases of all transmitters are equal to a common, but unknown, phase value $\phi$ (with respect to the mobile receiver referred to the monitor location) given by the following equation:

$$\phi = r_i(X_M, Y_M) + t_i \qquad (4)$$

Substituting $t_i$ from equation (4) into equation (3) yields the following equation:

$$\phi_i = r_i(X, Y) + [\phi - r_i(X_M, Y_M)] \qquad (5)$$

Putting known quantities on the left ($\phi_i$ is a measured quantity, and $r_i$ is the known range in wavelengths from the ith transmitter to the control monitor) equation (5) becomes:

$$\phi_i + r_i(X_M, Y_M) = r_i(X, Y) + \phi \qquad (6)$$

Note that the right side of this equation differs from equation (1) only in that the unknown time offset t common to all transmitters is replaced by an unknown phase $\phi$ common to all transmitters. The left side of this equation may be viewed as a "modified measurement" of phase, $\phi_i$. The measurement is modified only in that to each phase $\phi_i$ measured, the receiver must add the known quantity $r_i$ ($X_M, Y_M$). Once that modified measurement is entered, the data processing at the receiver for this method of synchronizing the transmitters to a common phase $\phi$ at the monitor is the same as for the method of synchronizing all of the transmitters for equal phase at the transmitters. The least square solution minimizes $$C = \sum_{i=1}^{4} W_i\{[r_i(X, Y) + \phi] - [\phi_i + r_i(X_M, Y_M)]\}^2 \qquad (7)$$

Note that the constant phase $\phi$ in equation (7) to which all transmitters are synchronized at the monitor plays a role that is mathematically equivalent to the use of the time offset t in equations (1) and (2) for the first method of synchronizing the transmitters. The monitor could be placed at a precise point where the propagation time, $t_i$, from each transmitter is the same, thereby simplifying the algorithm outlined in equations (3) to (7), but that would not be practical. Instead the monitor is optimally located to divide any error.

Equations (1) to (7) effectively assume that the navigation receiver is stationary, i.e., the algebraic unknowns X, Y and t (or $\phi$) are constants to be obtained by solution of the equations. Should it be desired to accommodate a receiver moving at velocities $\dot{X}$, $\dot{Y}$ or to accommodate a driftrate $\dot{t}$ (or $\dot{\phi}$) of the receiver's time offset with respect to the transmitter system, the equations (1) to (7) may readily be reformulated to include such velocities and driftrate. The method of least squares then produces algebraic solutions for X, Y, t, $\dot{X}$, $\dot{Y}$, $\dot{t}$ in a manner similar to that used for stationary navigation. The generalization of equations (1) to (7) to accommodate a plurality of frequencies is equally straightforward.

Once a receiver measures $\phi_i$, the microprocessor effectively determines the space relationship of the receiver to the transmitter and applies corrections using a three-dimensional position and temporal dependent propagation correction table, with interpolation between tabulated values provided at approximately one kilometer intervals. Since the total phase delay is a function of the refractive index of the atmosphere, with a possible variation of as much as 20 to 30 meters of propagation over the total maximum range of interest (70 km), it would be necessary to provide a plurality of tables for a plurality of refractive indices. These correction tables are predetermined and stored in the receivers. The command control central then periodically issues an instruction to at least one of the transmitters to transmit to all receivers a data code indicating which table to use.

The monitor M may be implemented with a receiver not unlike the field receivers. The receiver strips filter, amplify and detect the signal phases, and present to the microprocessor the phase measurements. As in the field receivers, the microprocessor identifies the transmitters from the biphase modulated pattern it receives. Having identified the transmitters, the microprocessor simply computes an average phase measurement, and then computes the corrections required to advance, or retard, the phase of the transmitters to that average phase. The corrections are then transmitted via cable or UHF radio to the respective transmitters. In the case of radio transmission, one command is transmitted for each transmitter on the same carrier with an operation code indicating phase correction, a transmitter identification code and the amount of correction for that transmitter. Each transmitter will then act on only the command having its identification code. The same technique would, of course, be used if all transmitters were connected to a common cable.

What is claimed is:

1. A method of low-frequency radio navigation comprising the steps of transmitting from each of at least three spatially displaced transmitters at known locations a signal of at least one frequency selected from a range of about 200 kHz to about 500 kHz to assure operation with essentially pure ground wave, each transmitter being keyed on for an equal and constant burst length in a predetermined time-division multiplexed pattern, and at least one transmitter being biphase modulated in a predetermined order of repetitions of said pattern to identify said one transmitter, and therefore all transmitters from the multiplex pattern, phase synchronizing the transmitted signals from all transmitters to a common value of phase as received by a monitor at a known location notwithstanding the biphase modulation of one transmitter at predetermined intervals identification of all transmitters, thereby creating a region of zero error within the service area, receiving signals from said transmitters at an unknown position, and at said unknown position identifying the absolute phase of said biphase modulated signal in the multiplex pattern from the predetermined order of the signals in the pattern, measuring the phase of each signal received at said unknown position from each transmitter, and from said phase measurements determining said unknown position by comparing measured phases with predetermined phases for all signals from all transmitters to determine the maximum likelihood of position.

2. A method as defined in claim 1 wherein said monitor is positioned within an area bounded by said transmitters to divide any error due to variations in propagation paths from the transmitters.

3. A method as defined by claim 1 wherein the average phase of signals received from all transmitters by said monitor is used as the common value of phase for phase synchronization of all transmitters.

4. A method as defined in claim 1 wherein N transmitters are employed with as many frequencies as there are transmitters cyclically permuted by frequency and transmitter, where N is an integer greater than 2, whereby every transmitter is transmitting at all times on a different frequency, and all change frequency in unison in N time slots to produce a cyclic pattern of transmission from all transmitters.

5. A method as defined in claim 1 wherein N transmitters are employed with up to N frequencies cyclically permuted by frequency and transmitter in a basic pattern and all transmitters are biphase modulated in a predetermined order of repetitions of said patterns such that the number of inverted frequency patterns is equal to the number of uninverted frequency patterns for identification of transmitters and determination of absolute phase with interference suppression by allowing any interference to be integrated out of phase measurements.

6. A method as defined by claim 1 wherein signal transmission from at least one transmitter is biphase modulated with low-rate data for communications of short messages and said transmitter biphase modulated for communication is other than said designated one modulated for transmitter identification.

7. A method as defined by claim 1 wherein said signal transmission from said one transmitter biphase modulated for identification is modulated with low-rate data for communications of short messages during intervals between biphase modulation for transmitter identification.

8. A method as defined by claim 1 wherein the signal transmission from at least one transmitter is biphase modulated with low-rate data for communication of short messages and the data code for communication is a synchronizable code with an equal number of biphase modulated periods representing encoded binary 1 and 0 digits, thereby to allow interference from communications to be integrated out of phase measurements for navigation.

* * * * *